(12) United States Patent
Vallejo-Melgarejo et al.

(10) Patent No.: US 11,953,707 B2
(45) Date of Patent: Apr. 9, 2024

(54) SMOOTH SURFACE DIFFRACTION GRATING LENS AND METHOD FOR MANUFACTURING THE SAME

(71) Applicant: Purdue Research Foundation, West Lafayette, IN (US)

(72) Inventors: Laura Daniela Vallejo-Melgarejo, Bogota (CO); Jose Manuel Garcia-Bravo, Lafayette, IN (US); Brittany Ann Newell, Delphi, IN (US); Ronald George Reifenberger, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 652 days.

(21) Appl. No.: 17/147,537

(22) Filed: Jan. 13, 2021

(65) Prior Publication Data

US 2021/0215861 A1 Jul. 15, 2021

Related U.S. Application Data

(60) Provisional application No. 62/961,126, filed on Jan. 14, 2020.

(51) Int. Cl.
*G02B 5/18* (2006.01)
*B33Y 10/00* (2015.01)
(Continued)

(52) U.S. Cl.
CPC ............ *G02B 5/1814* (2013.01); *B33Y 10/00* (2014.12); *B33Y 80/00* (2014.12); *G01D 5/38* (2013.01); *G02B 1/041* (2013.01); *G02B 5/18* (2013.01); *G02B 5/1847* (2013.01); *G02B 27/4233* (2013.01)

(58) Field of Classification Search
None
See application file for complete search history.

(56) References Cited

U.S. PATENT DOCUMENTS

| 10,976,638 B2* | 4/2021 | De Smet | A61F 2/1627 |
| 2004/0095656 A1* | 5/2004 | Lee | G02B 3/08 |
| | | | 430/323 |
| 2017/0343490 A1* | 11/2017 | He | G01N 23/207 |

FOREIGN PATENT DOCUMENTS

EP 3499299 A1 * 6/2019 ........... G02B 5/1895

OTHER PUBLICATIONS

Burns, (1993), Automated Fabrication: Improving Productivity in Manufacturing, Prentice Hall, Englewood Cliffs, NJ, ISBN:0131194623.
(Continued)

*Primary Examiner* — Collin X Beatty
(74) *Attorney, Agent, or Firm* — Piroozi-IP, LLC (57) ABSTRACT

A multi-layer lens is disclosed which includes a plurality of dual-layer structures staked on top of one-another, wherein each dual-layer $R_i$ of the plurality of dual-layers includes i) a first curable material having a height of $Z_{Li}$ cured at a predetermined curing level $C_A$, and ii) a second curable material having a height of $Z_{gi}$ cured at a predetermined curing level $C_B$.

20 Claims, 6 Drawing Sheets

(51) Int. Cl.
  B33Y 80/00      (2015.01)
  G01D 5/38       (2006.01)
  G02B 1/04       (2006.01)
  G02B 27/42      (2006.01)

(56) References Cited

OTHER PUBLICATIONS

Chen et al., (2018), High-speed 3D printing of millimeter-size customized aspheric imaging lenses with sub 7 nm surface roughness, AdvancedMaterials, vol. 30, No. 18, p. 1705683.
Furlan et al., (2016), 3D printed diffractive terahertz lenses, Optics Letters, vol. 41 No. 8, pp. 1748-1751.
Gawedzinski et al., (2017), Quantitative evaluation of performance of 3D printed lenses, Optical Engineering, vol. 56 No. 8, p. 084110.
Gong et al., (2015), Optical approach to resin formulation for 3D printed microfluidics, RSC Advances, vol. 5 No. 129, pp. 106621-106632.
Lee et al., (2001), Cure depth in photopolymerization: experiments and theory, Journal of Materials Research, vol. 16 No. 12, pp. 3536-3544.
Li et al., (2017), Cost, sustainability and surface roughness quality—a comprehensive analysis of products made with personal 3D printers, CIRP Journal of Manufacturing Science and Technology, vol. 16, pp. 1-11.
Melgarejo et al., (2018), Manufacture of lenses and diffraction gratings using DLP as an additive manufacturing technology, ASME 2018 Conference on Smart Materials, Adaptive Structures and Intelligent Systems, American Society of Mechanical Engineers, pp. V002T08A004-V002T08A004.
Monzon et al., (2017), Anisotropy of photopolymer parts made by digital light processing, Materials, vol. 10 No. 1, p. 64.
Pedrotti et al., (2017), Introduction to Optics, Cambridge University Press.
Riahi, (2016), Fabrication of corner cube array retroreflective structure with DLP-based 3D printing technology, Optical Review, vol. 23 No. 3, pp. 442-447.
Skliutas et al., (2018), Photosensitive naturally derived resins toward optical 3D printing, Optical Engineering, vol. 57 No. 4, p. 041412.
Squires et al., (2015), 3D printed terahertz diffraction gratings and lenses, Journal of Infrared, Millimeter, and Terahertz Waves, vol. 36 No. 1, pp. 72-80.
Sung et al., (2015), Fabricating optical lenses by inkjet printing and heat assisted in situ curing of polydimethylsiloxane for smartphone microscopy, Journal of Biomedical Optics, vol. 20 No. 4, p. 47005.
Vallejo-Melgarejo et al., (2019), Characterization of 3D-printed lenses and diffraction gratings made by DLP additive manufacturing. Rapid Prototyping Journal.
Nijiati (2017), Fabrication and characterization of PDMS lenses for smartphone microscopy. McMaster University.
Kiekens et al., (2019), 3D printed lens for depth of field imaging. OSA Continuum, 2(11), pp. 3019-3025.
Berglund et al., (2019), Fabrication of optical components using a consumer-grade lithographic printer. Optics express, 27(21), 30405-30420.

* cited by examiner

SMOOTH SURFACE DIFFRACTION GRATING LENS AND METHOD FOR MANUFACTURING THE SAME

CROSS-REFERENCE TO RELATED APPLICATIONS

The present patent application is related to and claims the priority benefit of U.S. Provisional Patent Application Ser. No. 62/961,126 filed Jan. 14, 2020 the contents of which are hereby incorporated by reference in its entirety into the present disclosure.

STATEMENT REGARDING GOVERNMENT FUNDING

The present disclosure was not made with government support.

TECHNICAL FIELD

The present disclosure generally relates to diffraction gratings, and in particular, to a method of manufacturing diffraction gratings.

BACKGROUND

This section introduces aspects that may help facilitate a better understanding of the disclosure. Accordingly, these statements are to be read in this light and are not to be understood as admissions about what is or is not prior art.

Diffraction gratings are generally implemented to spatially disperse light. In particular, a diffraction grating can be used to spatially disperse a wide-spectrum light into light of different wavelengths.

The first recorded man-made diffraction grating dates back to 1785 by David Rittenhouse. He strung strands of hair between two screws. Since then, many improvements have been realized in the field of diffraction gratings. Spatial gratings have nowadays replaced prisms in most fields of spectral analysis.

Various methods of manufacturing diffraction gratings have been developed over last few decades. Many of such methods require a substrate which comprise the steps of forming a photosensitive material layer and a light transmission reducing film having a predetermined pattern integrally with each other on the substrate, and processing the photosensitive layer. However, these methods require sophisticated equipment and are limited by a specific manufacturing approach.

Therefore, there is an unmet need for a novel methodology to manufacture diffraction gratings that are easy to manufacture and provide repeatable and concise diffraction output.

SUMMARY

A method for manufacturing a diffraction grating lens is disclosed. The method includes a) depositing a layer of a curable material to a height of $Z_{Li}$, b) curing the layer of step (a) to a predetermined curing level $C_A$, c) depositing a layer of the curable material to a height of $Z_{gi}$ atop the cured layer of step (b), (d) curing the layer of step (c) to a predetermined curing level $C_B$, and (e) repeating steps (a) through (d) in a bottom up manner forming a lens having a thickness t, wherein each combination of the layers of step (a) and step (c) form a 3-dimensional rectangular-like shape $R_i$ of the lens having a depth constituting the thickness t of the lens.

A multi-layer lens is also disclosed. The multi-layer lens includes a plurality of dual-layer structures staked on top of one-another. Each dual-layer $R_i$ of the plurality of dual-layers includes i) a first curable material having a height of $Z_{Li}$ cured at a predetermined curing level $C_A$, and ii) a second curable material having a height of $Z_{gi}$ cured at a predetermined curing level $C_B$.

An angular movement sensing system is also disclosed. The system includes a first multi-layer lens adapted to be mounted onto a first object. Light incident on the first multi-layer lens is adapted to diffract. The system also includes a second multi-layer lens adapted to be mounted onto a second object, wherein angular movement of the first object with respect to the second object is to be measured. Light incident on the second multi-layer lens is adapted to diffract. Each of the first multi-layer lens and the second multi-layer lens includes a plurality of dual-layer structures staked on top of one-another. Each dual-layer $R_i$ of the plurality of dual-layers includes i) a first curable material having a height of $Z_{Li}$ cured at a predetermined curing level $C_A$, and ii) a second curable material having a height of $Z_{gi}$ cured at a predetermined curing level $C_B$. The system further includes a light source adapted to be shone on the first multi-layer lens such that the first multi-layer diffracted light is incident on the second multi-layer lens. The system further includes a plurality of light sensors a distance away from the second multi-layer lens and adapted to sense the first multi-layer diffracted light and the second multi-layer diffracted light. The system also includes a data-processing system. The data-processing system is adapted to receive signals from the plurality of light sensors corresponding to the first multi-layer diffracted light and the second multi-layer diffracted light. The data-processing system is further adapted to determine angular relationship between the first multi-layer diffracted light and the second multi-layer diffracted light to thereby determine the rotational relationship between the first multi-layer lens and the second multi-layer lens.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel methodology to manufacture diffraction gratings is presented herein that are easy to manufacture and provide repeatable and concise diffraction output. Towards this end, a novel additive manufacturing methodology is presented herein for the manufacture of selectable diffraction gratings.

Figure 1:
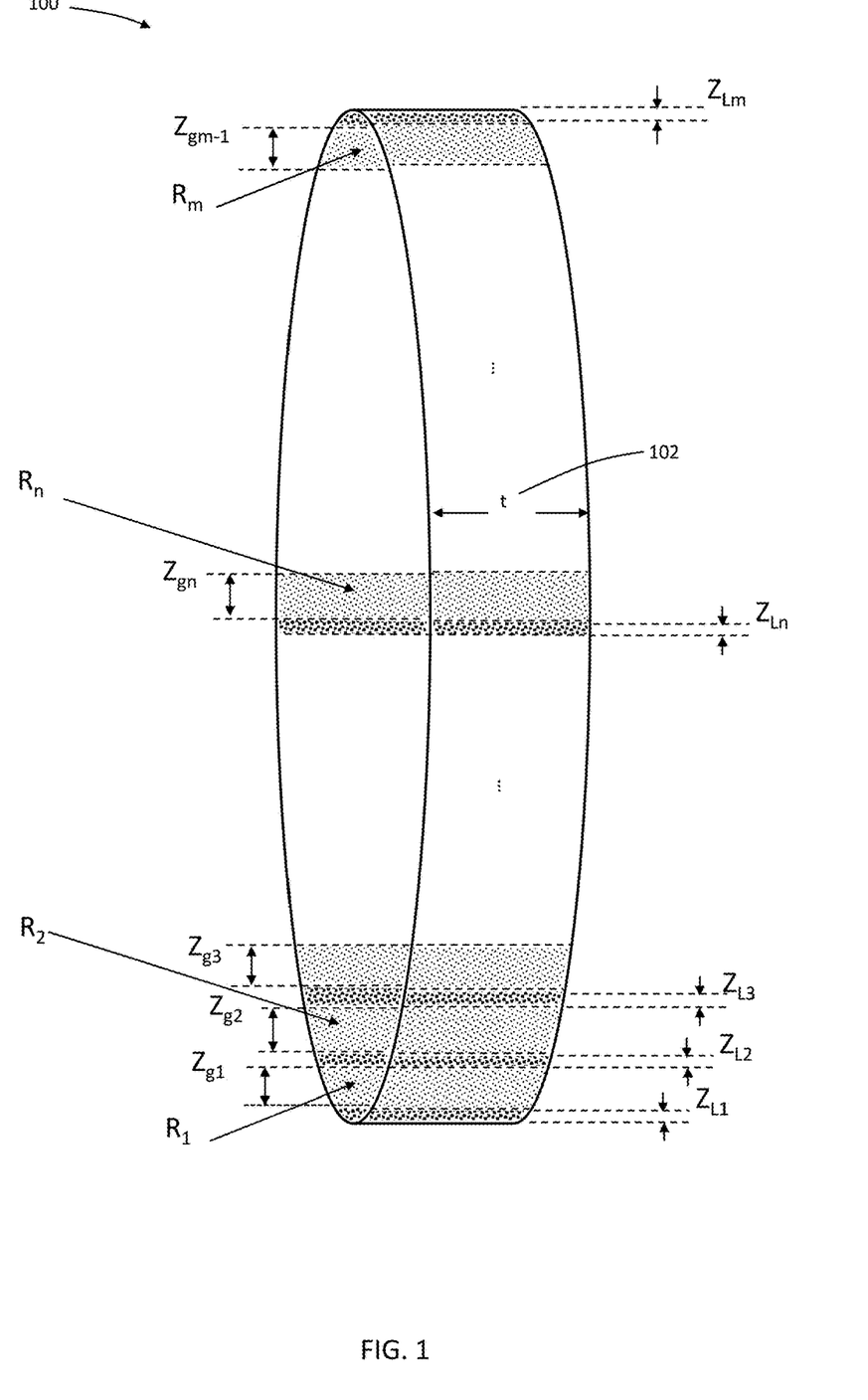
FIG. 1 is a perspective view of a multi-layer lens according to the present disclosure.
Figure 2:
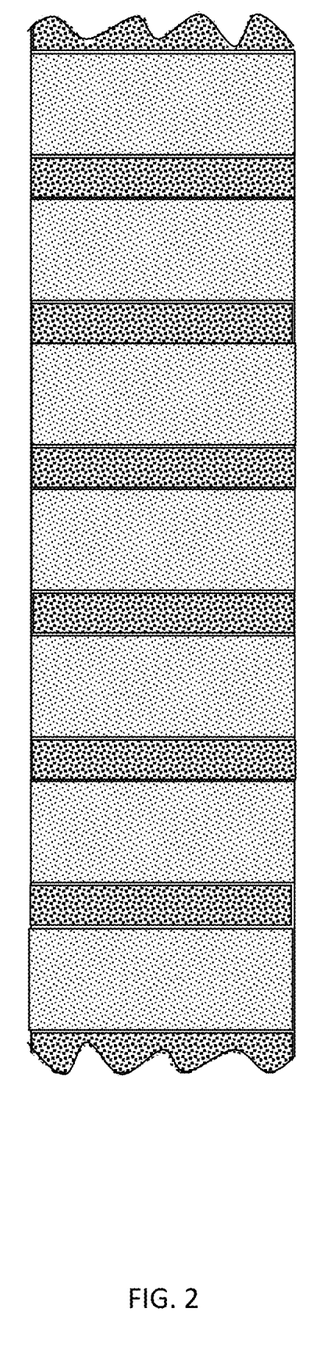
FIG. 2 is a partial cross-sectional view of the multi-layer lens of FIG. 1.

Referring to FIG. 1, the results of this manufacturing technique is shown. The novel method includes 3D printing a lens 100 (e.g., a circular lens, but other shapes are within the scope of the present disclosure) having a substantially uniform thickness 102 (identified as "t") from bottom up. It should be understood the phrase lens in the present disclosure refers to a semi-flat flat cylinder with both sides having semi-flat surface, although one or both of the surfaces may be other than completely flat, for example, curved faces to produce an optical lens with a well-defined focal length. The uniform thickness is shown in FIG. 1 as a multi-layer 3D printed rectangular-like sections $R_i \ldots R_2 \ldots R_n \ldots$, and $R_m$. These rectangular-like sections include a plurality of dual-layers stacked on one-another, each layer of the dual layer being cured at a different level. These dual layers include a first dual-layer that is printed having a depth that constitutes the complete thickness 102 of the lens 100 forming a first rectangular-like shape $R_1$, and a second dual-layer that is printed having a depth that constitutes the complete thickness 102 of the lens 100 atop the first dual-layer forming a second rectangular-like shape $R_2, \ldots$, an $n^{th}$ dual-layer that is printed having a depth that constitutes the complete thickness 102 of the lens 100 forming an $n^{th}$ rectangular-like shape $R_n, \ldots$, and an $m^{th}$ dual-layer that is printed constitutes the last layer having a depth that that constitutes the complete thickness 102 of the lens 100 forming an $m^{th}$ rectangular-like shape $R_m$, and which is opposite the first dual layer $R_1$. While in the present disclosure printed shapes are identified as rectangular-like ($R_i$), it should be appreciated that other shapes are also within the scope of the present disclosure, including but not limited to crescent-like shapes, etc. Each layer of the dual layer is alternatively cured to a predetermined curing level. For example, a first layer of the first dual-layer $R_1$ is fully cured (or alternatively cured at a predetermined curing of $C_A$), the second layer of the first dual-layer $R_1$ is partially cured to a predetermined curing level $C_B$, a first layer of the second dual-layer $R_2$ is fully cured (or alternatively cured at a predetermined curing of $C_A$), a second layer of the second dual-layer $R_2$ is partially cured to a predetermined curing level $C_B$, and so on. Each of the fully cured layers (or alternatively cured at a predetermined curing of $C_A$) has a uniform height of about $Z_{Li}$. Furthermore, each fully cured layer (or alternatively cured at a predetermined curing of $C_A$) is spaced apart from the next fully cured layer (or alternatively cured at a predetermined curing of $C_A$) by an intervening partially cured layer having a height of $Z_{gi}$. Therefore, the construction of the lens once 3D printed is based on thicknesses $Z_{L1}, Z_{g1}, Z_{L2}, Z_{g2}, Z_{L3}, Z_{g3}, \ldots Z_{Ln}, Z_{gn}, \ldots, Z_{gm-1}, Z_{Lm}$, where $Z_{L1}$ is substantially the same as $Z_{L2}, Z_{L3}, \ldots Z_{Ln}, \ldots, Z_{Lm}$ and $Z_{g1}$ is substantially the same as $Z_{g2}, Z_{g3}, \ldots Z_{gn}, \ldots, Z_{gm-1}$. As discussed above, referring to FIG. 1, a perspective view of the lens 100 3D printed according to the present disclosure is shown. As discussed above, the height of fully cured layers (or alternatively cured at a predetermined curing of $C_A$) and partially cured layers are shown in the alternative order as $Z_{L1}, Z_{g1}, Z_{L2}, Z_{g2}, Z_{L3}, Z_{g3}, \ldots Z_{Ln}, Z_{gn}, \ldots, Z_{gm-1}, Z_{Lm}$ in a bottom up arrangement where each layer having a depth that constitutes the complete thickness 102 of the lens 100. FIG. 2 is a partial side view of the lens showing alternative layers of the fully cured layers (or alternatively cured at a predetermined curing of $C_A$) and partially cured layers ($C_B$). The height $Z_{Li}$ according to the present disclosure is between about 1 μm and about 100 μm. The height $Z_{g1}$ according to the present disclosure is between about 1 μm and about 100 μm.

As shown in FIGS. 1 and 2, the heights of the fully cured layers (or alternatively cured at a predetermined curing of $C_A$) denoted as $Z_{Li}$ and partially cured ($C_B$) layers denoted as $Z_{gi}$ can be different or the about the same. Typically the curing is performed by exposure to UV light. The degree of curing is based on the duration of exposure to UV light. Various materials can be used for printing the lens 100 of the present disclosure. One such example is photocurable resin PR48, however other photocurable resins known to a person having ordinary skill in the art are within the scope of the present disclosure. Other examples of photocurable resin include but are not limited to FORMLAB's CLEAR—comprising Methacrylated oligomers, Methacrylated monomer, and Photoinitiators—and ANYCUBIC's TRANSLUCENT UV resin—comprising resin monomer & photo initiator. PR48 CLEAR comprises two oligomers, a photoinitator, a reactive dilutent, and a UV blocker. The oligomers in this resin are Allnex Ebecryl 8210 (39.776% wt/wt) and Sartomer SR 494 (39.776% wt/wt). Ebecryl 8210 is an aliphatic urethane acrylate. Ebecryl 8210 has low viscosity and high reactivity in Ultraviolet (UV) radiation. These materials provide increased flexibility, toughness, chemical resistance, and yellowing. Sartomer SR 494 is an alkoxylated pentaerythritol tetraacrylate. SR 494 is a multifunctional acrylic monomer that can be polymerized by free radicals, such as UV or electron beam. The PR48 contains one reactive monomer, Rahn Genomer 1122 (19.88% wt/wt). This material reduces viscosity and crosslink in the cured resin. The photoinitiator, Esstech TPO+ (0.4% wt/wt) is a catalyst used to initiate the reaction at 405 nm UV light and a light projection power of 22.5 mW/cm². Free radicals are formed from breakdown of the photoinitiator when exposed to UV light. These free radicals start the cross-linking process of the monomers and oligomers. The UV blocker, Mayzo OB+(0.16% wt/wt) functions to control UV penetration which confines the cure layer thickness. Within these bonded structures, several parameters can affect the formation of microvoids inherent to the 3D printed structures and particularly to the 3D printed lens 100 of the present disclosure. These voids or channels which directly affect print resolution are affected by the optical dose received and the exposure between layers. In areas where overexposure occurs, at denser layer builds, photopolymerization lasts for a longer time resulting in sections with overall more opaque features. However, it should be noted other materials, known to a person having ordinary skill in the art, may also be used which allow light passage when partially cured and light blockage when cured at a predetermined level or fully cured.

The alternate curing of the alternate layers as discussed above results in a diffraction grating that diffracts a focused ray of light for example the light of a laser pointer. Such light passes through layers of partially cured material and is blocked at the fully cured layers. An example of such diffraction grating lens includes fully cured layers (or alternatively cured at a predetermined curing of $C_A$) with height $Z_{Li}$ of about 25 μm and distance between layers ($Z_{gi}$) of about 6 μm (i.e., height of partially cured layers).

Figure 3:
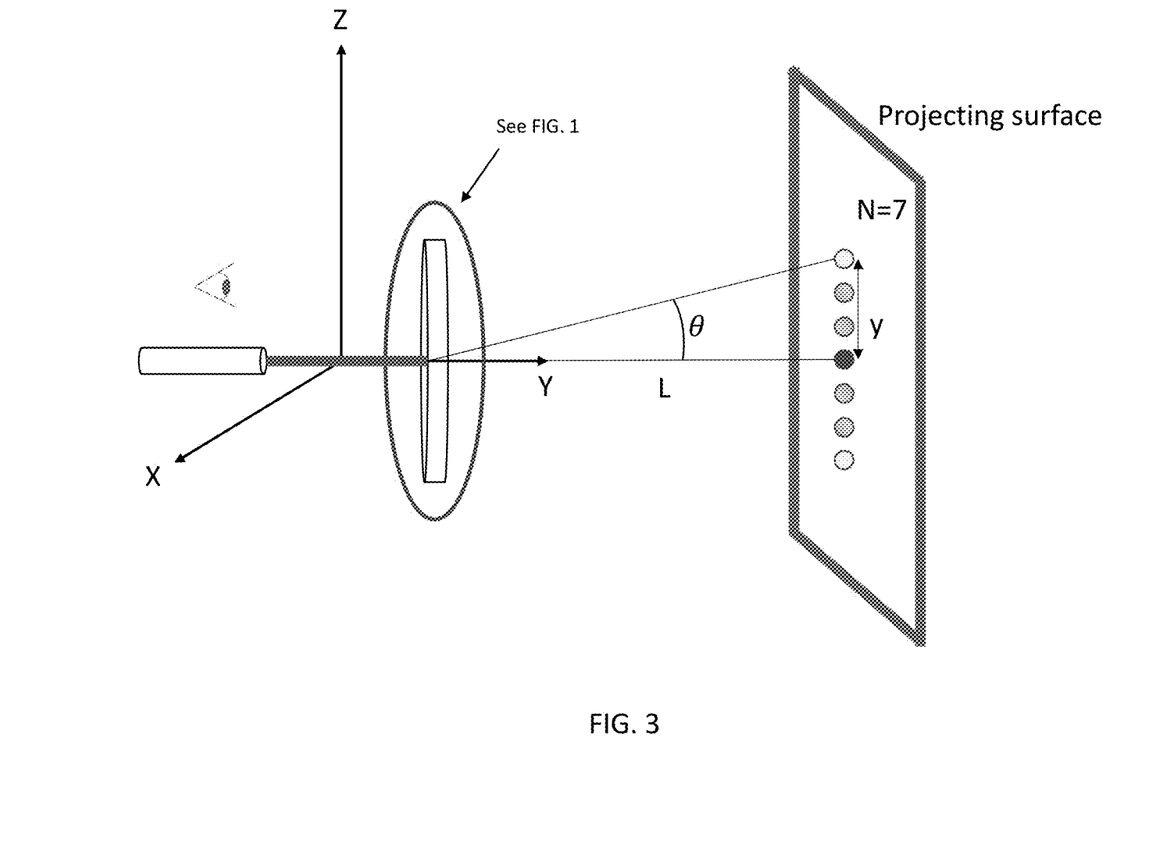
FIG. 3 is a schematic of a test setup for a transmissive grating of the multi-layer lens of FIG. 1.
Figure 4:
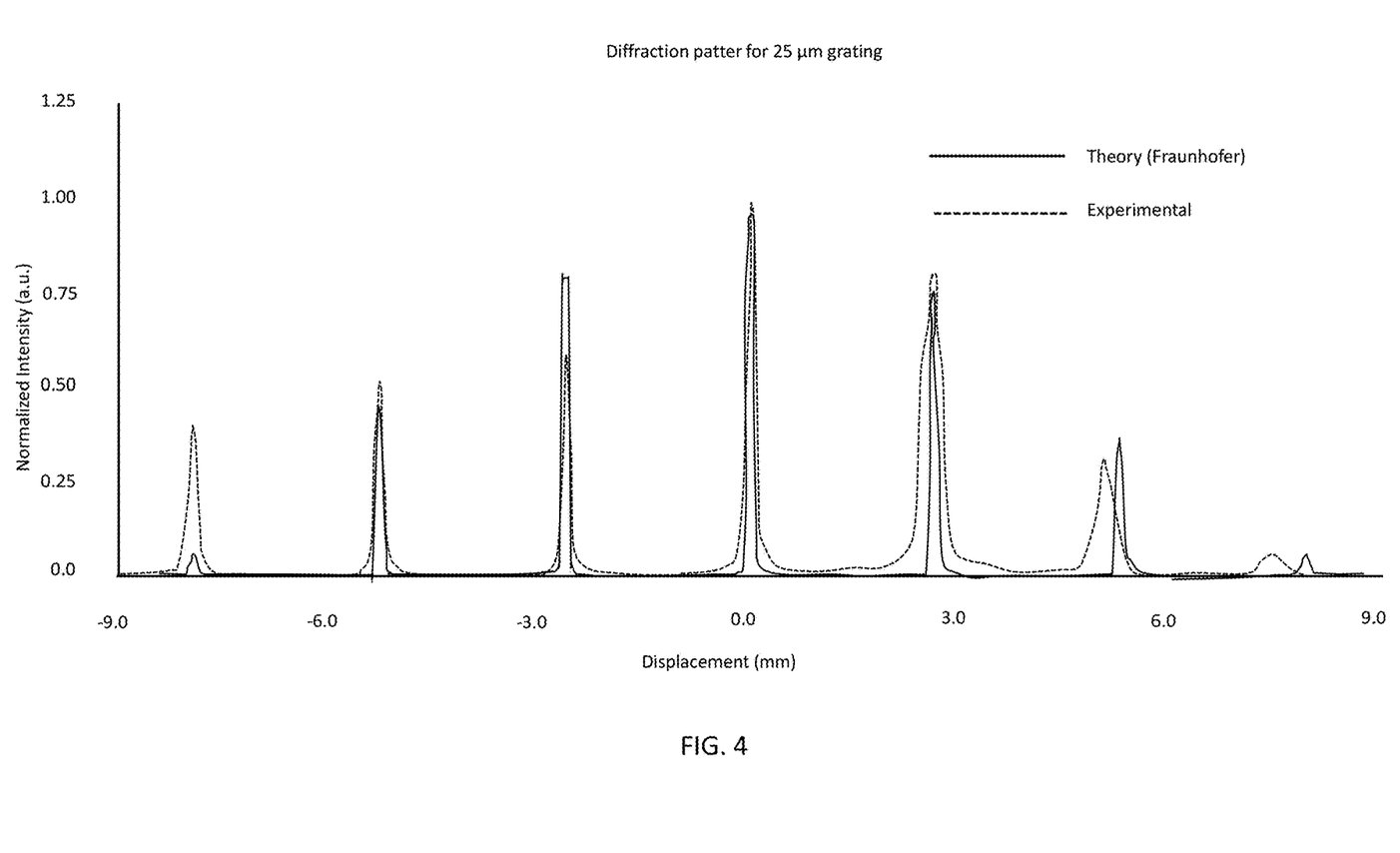
FIG. 4 is a graph of normalized intensity vs. distance in mm from the center dot of a diffraction pattern on a screen a distance away from the multi-layer lens of FIG. 1.

When a laser having a nearly circular intensity profile is pointed at the lens 100, the lens 100 of the present disclosure becomes a transmissive or reflective diffraction grating resulting in dots formed on a screen a distance away from the lens. It should be noted, however, that when the incident illumination or the shape of the lens is of different arrangements, e.g., a line profile such as that produced by a barcode scanner, then the diffracted pattern would have the appearance of lines rather than dots. The formed dots vary in intensity, where the center dot has the highest intensity and the neighboring dots have lower intensities. Referring to FIG. 3, a schematic of a test setup for a transmissive grating is shown. The intensity of the dots on a projected surface or screen can be measured via optical instruments. A seen in FIG. 3, a laser source is shone through the diffraction grating lens 100 of the present disclosure and various dots are projected onto a screen a distance away. The center dot (n=0, known as the central maximum) has the highest intensity and the dots adjacent to the center dot have progressively lower intensities. These intensities are also shown in FIG. 4, where a graph of normalized intensity is shown vs. distance in mm from the center dot. As can be seen from the graph of FIG. 4, the intensity is highest at the center dot and progressively lowers at dots further away.

Once the lens according to the present disclosure is printed, the intensity of the projected dots will vary. As discussed above, the center dot will have the highest intensity, and the subsequent pair (above and below the central maximum) will have a lesser intensity, and so on. The intensity and location of the diffracted beam, projected on a viewing screen, will be a function of the original light intensity Io as characterized by the Fraunhofer grating equation provided below.

$$I = I_0 \left(\frac{\sin\beta}{\beta}\right)^2 \left(\frac{\sin(N\alpha)}{\sin\alpha}\right)^2$$

Where, $$\beta = \frac{\pi w \sin\theta}{\lambda},$$

$$\alpha = \frac{\pi d \sin\theta}{\lambda},$$

w is the effective width of an individual slit (i.e., height $Z_{Li}$),
d is the effective distance between the slits (i.e., height $Z_{gi}$),
A is the wavelength of incident coherent light through the periodic slits,
θ is the geometric angle between the optical axis of the grating (determined by an imaginary line centered on the grating and oriented perpendicular to the grating, i.e. the centerline, see FIG. 3) and a specified lateral position on a distant viewing screen, and
N is an integer that specifies the approximate number of illuminated slits.

These parameters define the characteristics of the diffraction pattern formed by the diffraction grating. The parameters a and 3 are determined by the physical characteristics of the grating (d and w) along with the value of the wavelength of the incident light λ, while the intensity at a position on the viewing screen is controlled by the angle θ. The angular width (the sharpness) of the features in the diffracted pattern (i.e. the spots) are largely controlled by N, the number of illuminated slits. The larger N, the sharper the diffracted spots. Therefore, as the angle θ increases (the angle at which a ray is diffracted), the intensity of the higher order diffracted spots is decreased. A laser with a larger initial intensity Io may create more dots. As can be seen in FIG. 4, with an increased distance from the centerline (corresponding to a larger value of 0) there is an overall decrease in intensity.

Figure 5:
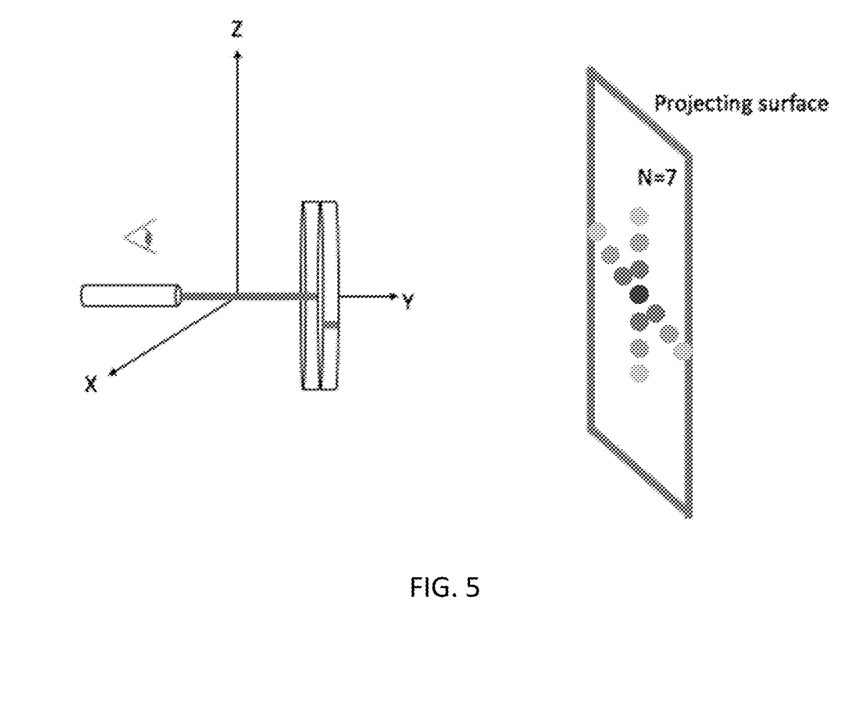
FIG. 5 is a schematic of test setup for an angular movement sensing system including two of the multi-layer lenses of FIG. 1.

FIG. 5 shows a first application of the diffraction grating lens of the present disclosure referred to herein as an angular movement sensing system whereby two such lenses are stacked against each other with one lens rotated a predetermined angle with respect to the other. In such an application, the diffracted light generates the same projected dots in the same angled relationship as the lenses. Such a system can be used to measure small amounts of relative movement between two structures. For example, in a second application, if one such lens deforms under loading (e.g., torsional moment, compression, tension or other loading scenarios), the lens system shown in FIG. 5 can form a deformation sensor, that requires no wires or external power to operate. The sensor is based on optical properties and may be tuned to measure the displacement or deformation caused by the loading. Furthermore, if a collimated laser beam is used to illuminate the sensor, the sensor can be interrogated remotely at a distance. The sensitivity of such a sensor to an applied load can be adjusted at the time of the additive manufacturing process by controlling the thickness t of the lens.

Figure 6:
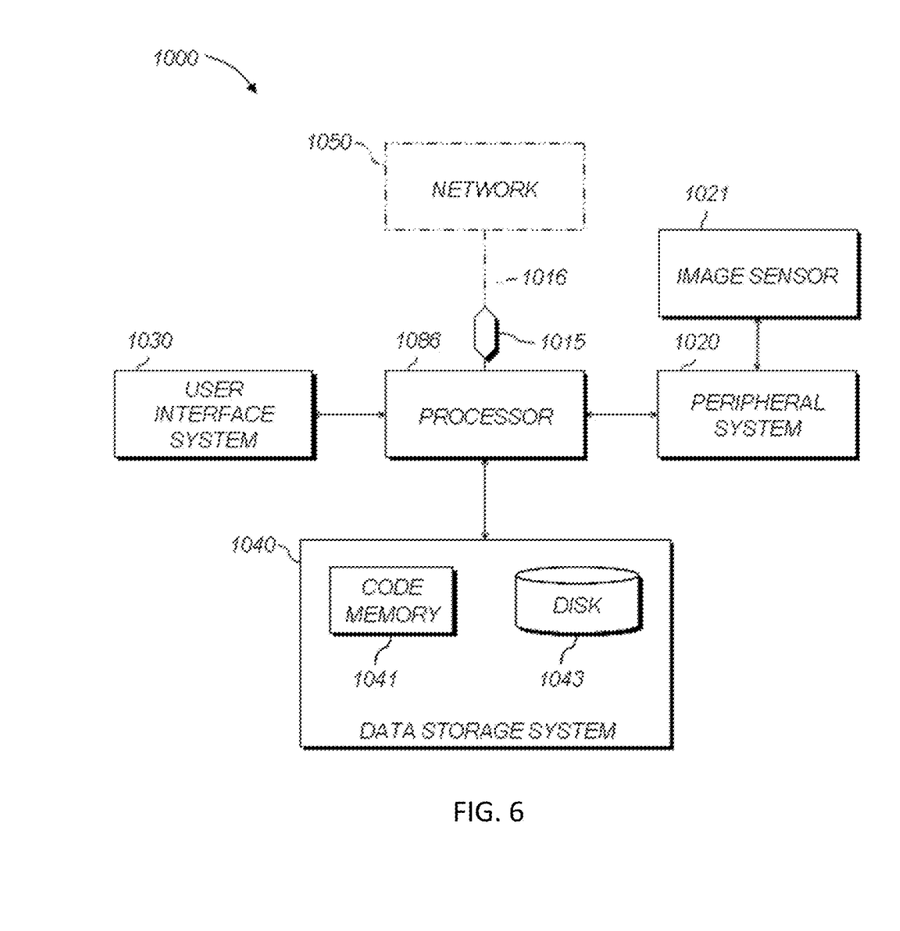
FIG. 6 is a schematic of an example of a data-processing system that is part of the angular movement sensing system of FIGS. 3 and 5.

In such an angular movement sensing system, the system includes a first multi-layer lens adapted to be mounted on a first object. Light incident on the first multi-layer lens is adapted to diffract. The system also includes a second multi-layer lens adapted to be mounted on a second object. The goal of the system is to measure angular movement of the first object with respect to the second object. Light incident on the second multi-layer lens is adapted to also diffract. As discussed above with reference to FIG. 1, each of the first multi-layer lens and the second multi-layer lens includes a plurality of dual-layer structures staked on top of one-another. Each dual-layer $R_i$ of the plurality of dual-layers includes i) a first curable material having a height of $Z_{Li}$ cured at a predetermined curing level $C_A$, and ii) a second curable material having a height of $Z_{gi}$ cured at a predetermined curing level $C_B$. As shown in FIG. 5, the system also includes a light source adapted to be shone on the first multi-layer lens such that the first multi-layer diffracted light is incident on the second multi-layer lens. While not shown, a plurality of light sensors a distance away from the second multi-layer lens are provide. These light sensors are adapted to sense the first multi-layer diffracted light and the second multi-layer diffracted light. The system also includes a data-processing system (see FIG. 6). The data-processing system which is described in reference to FIG. 6, is adapted to receive signals from the plurality of light sensors corresponding to the first multi-layer diffracted light and the second multi-layer diffracted light. The data-processing system (see FIG. 6) is further adapted to determine an angular relationship between the first multi-layer diffracted light and the second multi-layer diffracted light to thereby determine the rotational relationship between the first multi-layer lens and the second multi-layer lens.

Referring to FIG. 6, an example of a data-processing system is provided that is part of the above-discussed angular movement sensing system. Referring to FIG. 6, a high-level diagram showing the components of an exemplary data-processing system 1000 for analyzing data and performing other analyses described herein, and related components. The system includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The imaging described in the present disclosure may be obtained using imaging sensors 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processors). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

While in the present disclosure optical waves have been prominently discussed, no such limitation is intended. To this end, any type of electromagnetic wave can be used. A proper matching of a particular type of electromagnetic wave and a randomly scattering material can be employed for such analyzer-based detection. In addition, while a camera has been shown as a detector, it should be appreciated that a host of other detectors known to a person having ordinary skill in the art can also be used. Most importantly, the detected field changes can be attributed to any minute change in the system, thereby encompassing signals of various forms, and thus not be limited to a remote object's movement, as presented.

Those having ordinary skill in the art will recognize that numerous modifications can be made to the specific implementations described above. The implementations should not be limited to the particular limitations described. Other implementations may be possible.

The invention claimed is:

1. A method for manufacturing a diffraction grating lens, comprising:
    a) depositing a layer of a curable material to a height of $Z_L$;
    b) curing the layer of step (a) to a predetermined curing level $C_A$;
    c) depositing a layer of the curable material to a height of $Z_{gi}$ atop the cured layer of step (b);
    d) curing the layer of step (c) to a predetermined curing level $C_B$; and
    e) repeating steps (a) through (d) in a bottom up manner forming a lens having a thickness t, wherein each combination of the layers of step (a) and step (c) forms a multi-layer lens having a 3-dimensional rectangular-like shape $R_i$ of the lens having a depth constituting the thickness t of the lens, wherein the multi-layer lens is configured to diffract light incident thereon, and wherein if light is incident on a first multi-layer lens such that the diffracted light from the first multi-layer lens is configured to be incident on a second multi-layer lens, the diffract light from the first multi-layer lens and the diffract light from the second multi-layer lens are configured to be discriminateable so as to determine angular relationship between the diffracted light from the first multi-layer lens and the diffracted light from the second multi-layer lens to thereby determine the rotational relationship between the first multi-layer lens and the second multi-layer lens.

2. The method of claim 1, wherein the height $Z_{Li}$ is between about 1 µm and about 100 µm.

3. The method of claim 1, wherein the height $Z_{gi}$ is between about 1 µm and about 100 µm.

4. The method of claim 1, the curable material is a resin.

5. The method of claim 4, the resin is PR48 CLEAR.

6. The method of claim 4, the resin is FORMLAB's CLEAR resin.

7. The method of claim 4, the resin is ANYCUBIC's TRANSLUCENT UV resin.

8. A multi-layer lens, comprising:
    a plurality of dual-layer structures staked on top of one-another, wherein each dual-layer $R_i$ of the plurality of dual-layers includes i) a first curable material having a height of $Z_{Li}$ cured at a predetermined curing level $C_A$, and ii) a second curable material having a height of $Z_{gi}$ cured at a predetermined curing level $C_B$, wherein the multi-layer lens is configured to diffract light incident thereon, and wherein if light is incident on a first multi-layer lens such that the diffracted light from the first multi-layer lens is configured to be incident on a second multi-layer lens, the diffract light from the first multi-layer lens and the diffract light from the second multi-layer lens are configured to be discriminateable so as to determine angular relationship between the diffracted light from the first multi-layer lens and the diffracted light from the second multi-layer lens to thereby determine the rotational relationship between the first multi-layer lens and the second multi-layer lens.

9. The multi-layer lens of claim 8, wherein the height $Z_{Li}$ is between about 1 µm and about 100 µm.

10. The multi-layer lens of claim 8, wherein the height $Z_{gi}$ is between about 1 µm and about 100 µm.

11. The multi-layer lens of claim 8, the curable material is a resin.

12. The multi-layer lens of claim 11, the resin is PR48 CLEAR.

13. The multi-layer lens of claim 11, the resin is FORMLAB's CLEAR resin.

14. The multi-layer lens of claim 11, the resin is ANYCUBIC's TRANSLUCENT UV resin.

15. An angular movement sensing system, comprising:
    a first multi-layer lens configured to be mounted on a first object, wherein light incident on the first multi-layer lens is configured to diffract;
    a second multi-layer lens configured to be mounted on a second object, wherein angular movement of the first object with respect to the second object is to be measured, and wherein light incident on the second multi-layer lens is configured to diffract, each of the first multi-layer lens and the second multi-layer lens comprising
        a plurality of dual-layer structures staked on top of one-another, wherein each dual-layer $R_i$ of the plurality of dual-layers includes i) a first curable material having a height of $Z_{Li}$ cured at a predetermined curing level $C_A$, and ii) a second curable material having a height of $Z_{gi}$ cured at a predetermined curing level $C_B$;
    a light source configured to be shone on the first multi-layer lens such that the first multi-layer diffracted light is incident on the second multi-layer lens;
    a plurality of light sensors a distance away from the second multi-layer lens and configured to sense the first multi-layer diffracted light and the second multi-layer diffracted light; and a data-processing system configured to
  receive signals from the plurality of light sensors corresponding to the first multi-layer diffracted light and the second multi-layer diffracted light, and
  determine angular relationship between the first multi-layer diffracted light and the second multi-layer diffracted light to thereby determine the rotational relationship between the first multi-layer lens and the second multi-layer lens.

16. The angular movement sensing system of claim 15, wherein the height $Z_L$ is between about 1 μm and about 100 μm.

17. The angular movement sensing system of claim 15, wherein the height $Z_{gi}$ is between about 1 μm and about 100 μm.

18. The angular movement sensing system of claim 15, the curable material is a resin.

19. The angular movement sensing system of claim 18, the resin is PR48 CLEAR.

20. The angular movement sensing system of claim 18, the resin is FORMLAB's CLEAR resin.

\* \* \* \* \*